US008960352B2

(12) United States Patent
Avigad et al.

(10) Patent No.: US 8,960,352 B2
(45) Date of Patent: Feb. 24, 2015

(54) WHEELCHAIR TRANSPORTATION SYSTEM

(71) Applicant: Ofek Eshkolot Research and Development Ltd., Karmiel (IL)

(72) Inventors: Gideon Avigad, Ramat Yishay (IL); Abraham Weiss, Eshchar (IL)

(73) Assignee: Ofek Eshkolot Research and Development Ltd, Karmiel (IL)

( * ) Notice: Subject to any disclaimer, the term of this patent is extended or adjusted under 35 U.S.C. 154(b) by 0 days.

(21) Appl. No.: 13/761,194

(22) Filed: Feb. 7, 2013

(65) Prior Publication Data

US 2014/0216838 A1 Aug. 7, 2014

(51) Int. Cl.
*B60P 3/06* (2006.01)

(52) U.S. Cl.
CPC ........................................ *B60P 3/06* (2013.01)
USPC .......................................................... 180/198

(58) Field of Classification Search
CPC ................ B60P 3/00; B60P 3/06; B60P 3/07; B60P 3/12; B60P 3/36; B60P 3/42
USPC .................................................. 180/198, 8.2
See application file for complete search history.

(56) References Cited

U.S. PATENT DOCUMENTS

| | | | | |
|---|---|---|---|---|
| 4,556,229 | A | 12/1985 | Bihler et al. | |
| 4,966,362 | A | 10/1990 | Ramaekers et al. | |
| 5,123,495 | A | 6/1992 | Littlejohn et al. | |
| 5,476,429 | A | 12/1995 | Bigelow et al. | |
| 5,643,143 | A | 7/1997 | Burak et al. | |
| 5,649,883 | A | 7/1997 | Mayes et al. | |
| 6,113,519 | A | 9/2000 | Goto | |
| 7,316,405 | B2 | 1/2008 | Kritman | |
| 7,347,426 | B2 * | 3/2008 | Negishi | 280/5.22 |
| 7,815,004 | B1 * | 10/2010 | Watkins et al. | 180/198 |
| 2007/0237616 | A1 | 10/2007 | Maxwell | |

FOREIGN PATENT DOCUMENTS

| | | |
|---|---|---|
| CN | 10186578 | 10/2010 |
| DE | 29904495 | 8/1999 |
| FR | 2949194 | 2/2011 |
| KR | 201000847 | 7/2010 |
| WO | WO9858827 | 12/1998 |
| WO | WO2004039612 | 5/2004 |
| WO | WO2006060389 | 6/2006 |

* cited by examiner

*Primary Examiner* — Tony Winner
(74) *Attorney, Agent, or Firm* — Soroker-Agmon

(57) ABSTRACT

A wheelchair transportation system for transporting a wheelchair over at least one obstacle, including a wheelchair transportation unit being operable to transport the wheelchair over the at least one obstacle during at least one transportation operation of the wheelchair. The wheelchair transportation unit includes a pivotal support platform configured to support the wheelchair and pivotally coupled to a chassis of the wheelchair transportation unit, the pivotal support platform includes at least one group of rotating members frictionally engaging at least one main wheel of the wheelchair. During the at least one transportation operation, the at least one main wheel being operable to rotate the at least one group of rotating members thereby a wheelchair user operably controls and guides the wheelchair transportation unit by adjusting at least one rotational speed of the at least one main wheel.

16 Claims, 10 Drawing Sheets

WHEELCHAIR TRANSPORTATION SYSTEM

FIELD OF THE INVENTION

The present invention relates to a wheelchair transportation system for transporting a wheelchair over at least one obstacle.

BACKGROUND OF THE INVENTION

The following prior art is believed to be the current status of the art:

PCT Publication WO 98/58827 describes a platform for transporting a wheelchair over an icy surface. The prior art platform does not include a control system enabling the user to control the speed of movement of the platform over an icy surface. In addition, this prior art platform does include a control system for controlling the horizontal orientation of the platform so as to maintain the wheelchair user in a horizontal plane during transportation over an incline.

U.S. Pat. No. 7,815,004 describes a motorized wheelchair platform enabling a user thereof to navigate uneven terrain. However, this prior art device does not provide a transportation unit which maintains the wheelchair in a horizontal plane during ascending and descending operations over obstacles.

KR 201000847 describes a wheelchair transporter for transporting a manual wheelchair on an inclined set of stairs. However, this prior art device only relates to manually controlled wheelchairs.

U.S. Pat. No. 7,316,405 describes a transport apparatus for climbing and descending stairs. This prior art device does not include a system for controlling the speed of the transport apparatus.

There is thus lacking in the prior art, a wheelchair transportation device enabling the user to control the transportation of the wheelchair over an obstacle using the accustomed and familiar control panel and/or joystick control as well as maintaining the wheelchair in a horizontal plane during ascending and/or descending an incline.

SUMMARY OF THE INVENTION

The present invention provides a wheelchair transportation unit enabling a wheelchair user, such as a handicapped user or an invalid residing on a motorized wheelchair parked on the wheelchair transportation unit, to control and guide the wheelchair transportation unit over at least one obstacle. The wheelchair user controls and guides the wheelchair transportation unit by means of the conventional and accustomed control panel and/or joystick located on the wheelchair.

The wheelchair transportation unit includes, inter alia, a pivotal support platform configured to support the wheelchair, which is pivotally coupled to the wheelchair transportation unit as well as a roll-on/roll-off ramp coupled to the pivotal support platform. The wheelchair user maneuvers the wheelchair on to the pivotal support platform via the roll-on/roll-off ramp and parks the wheelchair on the pivotal support platform. In the parking position, each one of the main wheels of the wheelchair resides between a group of rotating members, such as a pair of rotating cylinders, located on opposing sides of a longitudinal axis of the pivotal support platform.

Following the parking of the wheelchair on the wheelchair transportation unit, a helper activates a ramp control unit for placing the roll-on/roll-off ramp into a transportation configuration. In the transportation configuration, the roll-on/roll-off ramp does not interfere or inhibit the motion of the wheelchair transportation unit. Alternatively, the helper manually locates the roll-on/roll-off ramp into the transportation configuration. Prior to at least one transportation operation, the helper secures the wheelchair to the wheelchair transportation unit by activating a wheelchair securing device. Subsequently, the wheelchair user proceeds with the at least one transportation operation for transporting the wheelchair over the at least one obstacle.

The wheelchair user operates the wheelchair motor via the control panel and/or joystick in a conventional manner and the wheelchair motor rotates the main wheels of the wheelchair, in accordance with the user's instructions. Due to the frictional contact between each one of the main wheels of the wheelchair and a corresponding group of rotating members, the rotating members rotate at substantially the same tangential speed as the main wheels of the wheelchair.

At least one speed sensor is coupled to at least one member of the group of rotating members and measures the at least one speed of rotation of the rotating member. The measured speeds of rotation of the rotating members are forwarded to a controller unit. The controller unit processes the measured rotational speeds of the rotating members and computes corresponding rotational speeds of the main wheels. Using the computed corresponding rotational speeds of the main wheels, the controller unit computes a required at least one torque, which it forwards to a drive mechanism of the wheelchair transportation unit. The drive mechanism, in accordance with the computed at least one torque received from the controller unit, adjusts the movement, speed and direction of the wheelchair transportation unit.

The wheelchair transportation unit maintains its speed and direction while overcoming the at least one obstacle as though the user is controlling and guiding the wheelchair on a horizontal plane. Thus, the user is able to control the at least one transportation operation over the at least one obstacle by means of the familiar and accustomed wheelchair control panel and/or joystick. It is unnecessary for the user to have additional training for operating the transportation unit and the user is able to control the transportation of the wheelchair unit over the obstacle in accordance with the previous experience in using his/her wheelchair.

At least one pair of traction wheels is typically used for transporting the wheelchair transportation unit over uneven terrain as well as ascending and/or descending a flight of stairs. Additionally or alternatively, the transportation unit includes at least a pair of caterpillar tracks typically for transporting the wheelchair transportation unit over muddy/sandy terrain and/or an icy surface.

In addition, a gyroscope is attached to the pivotal support platform of the wheelchair transportation unit, enabling the wheelchair transport unit to maintain a horizontal orientation of the wheelchair during the at least one transportation operation over an elevated obstacle or through a depression.

It is appreciated that the wheelchair transportation unit is also operable with a manually operated wheelchair. For the wheelchair transportation unit supporting the manual wheelchair, the user controls and guides the movement of the wheelchair transportation unit by manually rotating the main wheels of the wheelchair.

There is provided in accordance with an embodiment of the present invention a wheelchair transportation system for transporting a wheelchair over at least one obstacle, including a wheelchair transportation unit being operable to transport the wheelchair over the at least one obstacle during at least one transportation operation of the wheelchair. The wheelchair transportation unit includes a pivotal support platform configured to support the wheelchair and pivotally coupled to a chassis of the wheelchair transportation unit. The pivotal support platform includes at least one group of rotating members frictionally engaging at least one main wheel of the wheelchair. During the at least one transportation operation, the at least one main wheel of the wheelchair being operable to rotate the at least one group of rotating members thereby a wheelchair user operably controls and guides the wheelchair transportation unit by adjusting at least one rotational speed of the at least one main wheel of the wheelchair.

Further in accordance with an embodiment of the present invention, the wheelchair transportation unit includes at least one speed sensor mechanically coupled to at least one member of the at least one group of rotating members and configured to measure at least one rotational speed of the at least one member of the at least one group of rotating members. The at least one speed sensor being operable to communicate to a controller unit the at least one measured rotational speed of the at least one group of rotating members.

Still further in accordance with an embodiment of the present invention, during the at least one transportation operation, the controller unit being operable to compute at least one torque corresponding to the at least one measured rotational speed of the at least one group of rotating members. The controller unit forwards the at least one computed torque to a drive mechanism of the wheelchair transportation unit thereby activating the drive mechanism to drive the wheelchair transportation unit over the at least one obstacle in accordance with the at least one computed torque.

Additionally in accordance with an embodiment of the present invention, the wheelchair transportation unit further includes an undercarriage configured to support the chassis. The undercarriage includes at least one traction unit mechanically coupled to the drive mechanism and being operable to transport the wheelchair transportation unit during the at least one transportation operation.

Moreover in accordance with an embodiment of the present invention, the drive mechanism includes at least one traction motor for generating a required traction power corresponding to the at least one computed torque, at least one gear box mechanically coupled to the at least one traction motor and at least one drive shaft mechanically coupled to at least one gear box to at least one traction unit and being operable to transfer the required traction power to at least one traction unit.

Further in accordance with an embodiment of the present invention, the at least one traction unit includes at least one pair of traction wheels. Additionally or alternatively, at least one traction unit includes at least one pair of caterpillar tracks.

Further in accordance with an embodiment of the present invention, the wheelchair transportation unit further includes a gyroscope attached to the pivotal support platform and being operable to sense at least one change in a pitch orientation of the pivotal support platform during the at least one transportation operation and a platform adjusting unit being operable to adjust the pitch orientation of the pivotal support platform. Subsequent to the gyroscope sensing the change in the pitch orientation, the gyroscope is configured to communicate at least one signal to the controller unit, thereupon the controller unit being further operable to forward at least one adjust-platform orientation instruction to the platform adjusting unit to adjust the pitch orientation of the pivotal support platform thereby operably maintaining a horizontal alignment of the pivotal support platform.

Still further in accordance with an embodiment of the present invention, the platform adjusting unit includes a first actuator having a first end coupled to the chassis and having a second end including at least one extendible arm pivotally coupled to the pivotal support platform and a first motor coupled to the first actuator and being operable to adjust a configuration of the at least one extendible arm. The first motor adjusts the configuration of the at least one extendible arm in accordance with the at least one adjust-platform-orientation instruction.

Additionally in accordance with an embodiment of the present invention, the adjusting of the configuration includes increasing a span of the at least one extendible arm. Additionally or alternatively, the adjusting of the configuration includes decreasing the span of the at least one extendible arm.

Further in accordance with an embodiment of the present invention, the wheelchair transporting unit further includes a securing unit attached to the pivotal support platform and configured to secure the wheelchair on the pivotal support platform. The securing unit includes at least one arch-shaped strut having a first end pivotally coupled to the pivotal support platform by means of a bracket and a second end pivotally coupled to at least one wheel harnessing unit and a second actuator mechanically coupled to the at least one arch-shaped strut and configured to displace the at least one wheel harnessing unit in a vertical plane above the pivotal support platform. Prior to the at least one transportation operation, the securing unit is activated whereby the at least one wheel harnessing unit engages at least one main wheel of the wheelchair without inhibiting rotation of the at least one main wheel.

Still further in accordance with an embodiment of the present invention, the at least one wheel harnessing unit includes at least one roller mechanically coupled to the at least one arched-shaped strut by means of at least one pin and at least one shaft, the at least one shaft includes a mechanical pressure sensor. Upon the at least one roller engaging the at least one main wheel, the mechanical pressure sensor senses an increase in mechanical pressure on the at least one shaft and the mechanical pressure sensor forwards a roller-engagement signal to the controller unit further configured to instruct the at least one arch-shaped strut to cease further movement.

Additionally in accordance with an embodiment of the present invention, the wheelchair transportation unit further including a roll-on/roll-off ramp pivotally coupled to the pivotal support platform. The wheelchair user maneuvers the wheelchair onto the pivotal support platform by means of the roll-on/roll-off ramp.

Moreover in accordance with an embodiment of the present invention, the at least one group of rotating members includes at least a first rotating member and at least a second rotating member, the at least first rotating member and the at least second rotating member being operably separated by an adjustable gap.

Further in accordance with an embodiment of the present invention, the wheelchair transportation unit further including a gap adjusting mechanism being operable to adjust the adjustable gap. The gap adjusting mechanism includes at least one pair of panels configured to support the at least first rotating member and the at least second rotating member, each member of the at least one pair of panels having a groove configured to support the at least first rotating member between the at least one pair of panels, the at least second rotating member being rotatably attached between the at least one pair of panels, and an actuator and motor unit mechanically coupled to the at least first rotating member by means of at least one shaft and being operable to laterally displace the at least first rotating member along the groove. The actuator and motor unit is activated to adjust the adjustable gap between the at least first rotating member and the at least second rotating member by laterally displacing the at least first rotating member relative to the at least second rotating member.

BRIEF DESCRIPTION OF THE DRAWINGS

A preferred embodiment of the current invention is described herein below with reference to the following drawings.

DETAILED DESCRIPTION OF PREFERRED EMBODIMENTS OF THE INVENTION

Figure 1:
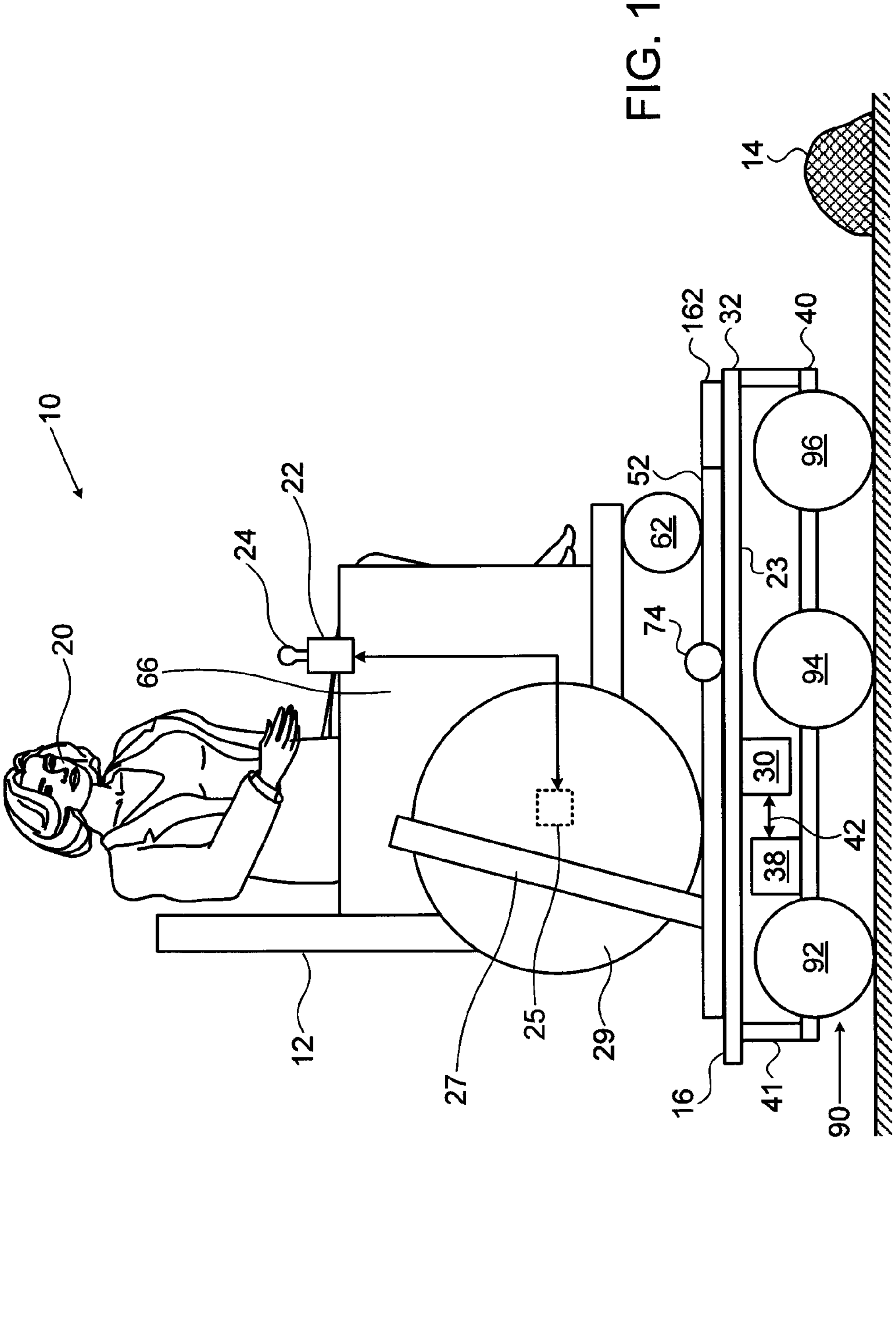
FIG. 1 presents a schematic view of a wheelchair transportation system for transporting a wheelchair over at least one obstacle, constructed and operative in accordance with a preferred embodiment of the present invention.

Reference is now made to FIG. 1, which presents a schematic view of a wheelchair transportation system 10 for transporting a wheelchair 12, over at least one obstacle 14, constructed and operative in accordance with a preferred embodiment of the present invention. The wheelchair transportation system 10 includes, inter alia, a wheelchair transportation unit 16 and the wheelchair 12, the wheelchair transportation unit 16 supports the wheelchair 12 during at least one transportation operation, such as transporting the wheelchair 12 over the at least one obstacle 14.

Typical obstacles include inter alia, ascending a flight of stairs, descending a flight of stairs, transportation over uneven terrain, such as muddy and/or sandy terrain and/or over an icy surface.

Typically, the wheelchair 12 includes the two main wheels 29 and 31, located on opposing sides of the wheelchair 12, two auxiliary wheels 62 and 64, located on the opposing sides of the wheelchair 12 and two lateral arm rests 66 and 68, located on opposing sides of the wheelchair 12. For the sake of clarity, only the main wheel 29, the auxiliary wheel 62 and the arm rest 66 are shown in FIG. 1.

The wheelchair transportation unit 16 further includes a pivotal support platform 52 for supporting the wheelchair 12 during the at least one transportation operation and a roll-on/roll-off ramp 162, which is pivotally coupled to the pivotal support platform 52 for providing wheelchair access to the wheelchair transportation unit 16, as described below. The pivotal support platform 52 is pivotally coupled to a chassis 32 of the wheelchair transportation unit 16 by means of pivots 74 and 76, as described below. For the sake of clarity, only the pivot 74 is shown in FIG. 1.

It is appreciated that the wheelchair transportation unit 16 is of sufficient structural integrity to support a combined weight of the wheelchair 12 and the user 20, typically, 1500 N.

A controller unit 30 for controlling and guiding the movement of the wheelchair transportation unit 16, as described below, is attached to a lower surface 23 of the chassis 32 and forwards control and guidance instructions to a drive mechanism 38 via a communications link 42.

The wheelchair transportation unit 16 further includes an undercarriage 40 which supports the chassis 32 by means of a plurality of struts 41. The undercarriage 40 includes, inter alia, a pair of wheel groups 90 and 91 (FIG. 2B). For the sake of clarity only the wheel group 90 is shown in FIG. 1. The wheel group 90 includes, inter alia, wheels 92, 94 and 96.

A wheelchair securing device 27 secures the wheelchair 12 to the wheelchair transportation unit 16 by means of wheelchair securing units 230 and 232, as described below with respect to FIGS. 6A and 6B. As described below, the wheelchair securing units 230 and 232 secure the wheelchair 12 to the wheelchair transportation unit 16, by engaging corresponding wheelchair main wheels 29 and 32, respectively, without inhibiting the rotation of the wheelchair's main wheels 29 and 31. The wheelchair securing device 27 ensures the confidence and safety of the user 20 during the at least one transportation operation.

A user 20 operates the wheelchair 12 by means of the control panel 22 and/or the joystick 24 operating a wheelchair motor 25. The wheelchair motor 25 is typically an electric motor. The user 20 maneuvers the wheelchair 12 onto the wheelchair transportation unit 16 by means of a roll-on/roll-off ramp 162 and parks the wheelchair 12 on the pivotal support platform 52, such that each one of the wheelchair's main wheels 29 and 31 is located between a group of rotating members, such as pairs of rotating cylinders (174 and 176), and (200 and 202) (FIGS. 4A and 4B), as described below.

Following the user 20 parking the wheelchair 12 on the wheelchair transportation unit 16, a helper places the ramp 162 into a transportation configuration, as shown in FIG. 1, so that the ramp 162 does not interfere and/or inhibit the at least one transportation operation. The helper activates a ramp control unit for placing the ramp into a transportation position. Alternatively, the helper manually places the ramp into the transportation configuration.

Subsequent to the helper placing the ramp 162 into the transportation position and prior to the at least transportation operation, the helper secures the wheelchair 12 to the wheelchair transportation unit 16 by activating the securing wheelchair device 27. Subsequently, to securing the wheelchair 12 to the wheelchair transportation unit 16, as described below, the wheelchair transportation unit 16 is in an operational configuration for commencing the at least one transportation operation.

The user 20 activates the wheelchair motor 25 from the control panel 22 and/or joystick 24, as is known in the art and the wheelchair motor 25 commences rotating the main wheels 29 and 31 of the wheelchair 12. Due to frictional contact between each one of the main wheels 29 and 31 and a corresponding group of rotating members, such as the pair of rotating cylinders (176 and 178), and (200 and 202), respectively, (FIG. 4A), each group of corresponding rotating members rotates at substantially the same tangential speed as the wheelchair's main wheels 29 and 31.

The wheelchair transportation unit 16 includes, inter alia, speed sensors 33 and 35 (FIG. 4B), such as rotary encoders. The sensors 33 and 35 are configured to measure the rotational speeds of the corresponding pairs of rotating members, such as rotating cylinders (176 and 178), and (200 and 202), respectively, as described below. The sensors 33 and 35 forward at least one rotational speed of each one of the corresponding member of the group of rotating members, such as each one of the corresponding pairs of rotating cylinders, (176 and 178), and (200 and 202), respectively, to the controller unit 30, as described below.

It is appreciated that due to the typical differences between the diameters of the wheelchair's main wheels 29 and 31 and the rotating cylinders 176, 178, 200 and 202, the rotational speeds of the main wheels 29 and 31 and the pairs of rotating cylinders (176 and 178), and (200 and 202) are different. The controller unit 30 processes the measured rotational speeds of the cylinders (176 and 178), and (200 and 202) and computes a corresponding at least one rotational speed for the wheel groups 90 and 91 (FIG. 2B) for the wheelchair transportation unit 16.

It is appreciated that the controller unit 30 includes a memory for storing, inter alia, requisite wheelchair data for operating the transportation unit 16, such as the diameters of wheelchair's main wheels as well as diameters of the members of each group of rotating members, such as the diameters of the rotating cylinders (176 and 178) and (220 and 202). Typically, the wheelchair data is inputted into controller unit's memory by the helper, prior to the at least one transportation operation. The helper selects the relevant wheelchair data stored in the memory and the controller unit 30 utilizes these data during the at least one transportation operation.

Using requisite stored data, such as the wheelchair transportation unit's dimensions and configuration and the computed rotational speeds, the controller unit 30 computes at least one computed torque, as is known in the art. The at least one computed torque is forwarded to the drive mechanism 38, which generates the required traction power for operating traction units 45A and 45B (FIG. 2B) of the wheelchair transportation unit 16, in accordance with the computed rotational speeds of the wheelchair wheels 29 and 31.

Figure 2A:
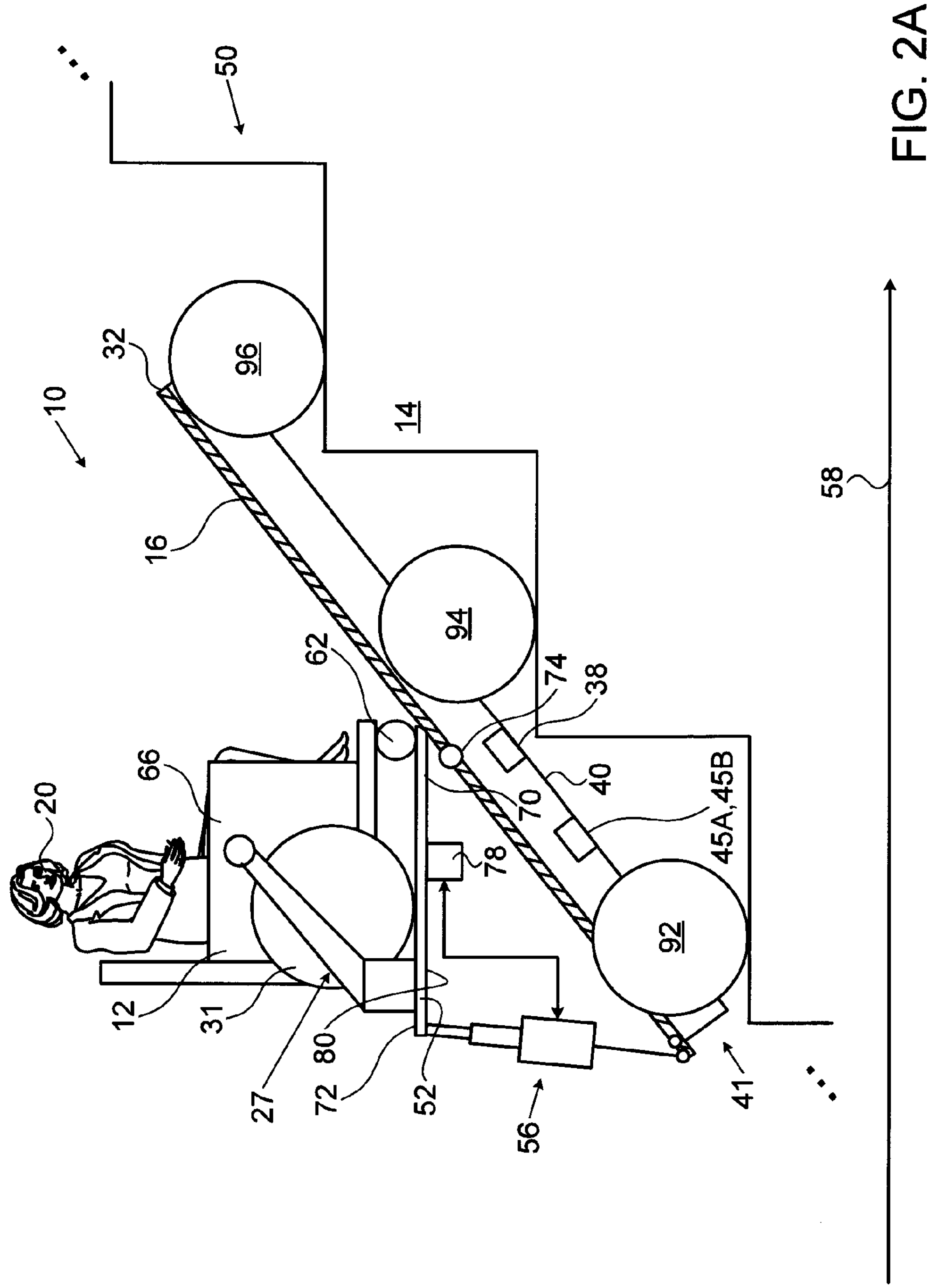
FIG. 2A present details of a wheelchair transportation unit for transporting the wheelchair over the at least one obstacle, constructed and operative in accordance with a preferred embodiment of the present invention.
Figure 2B:
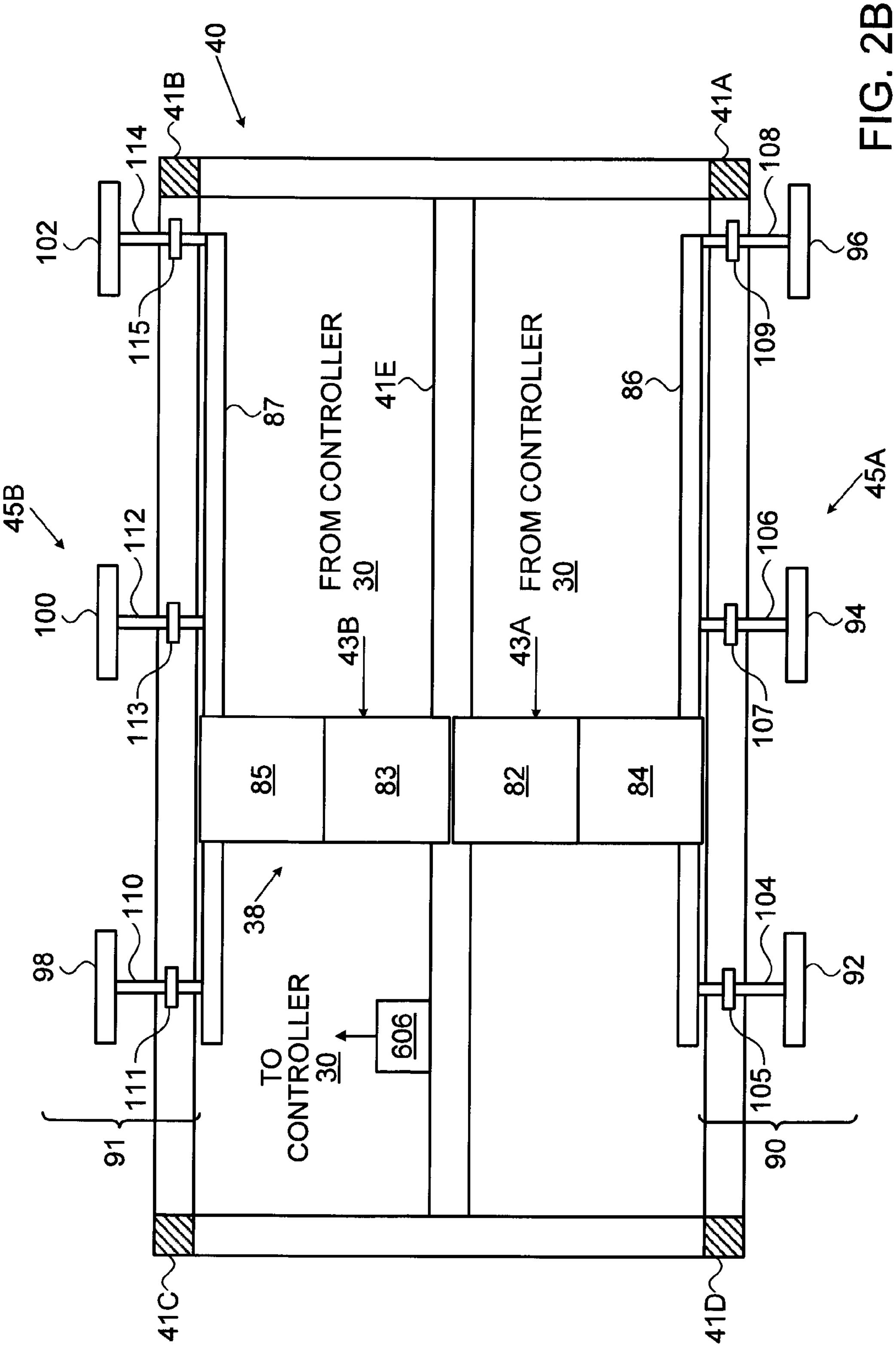
FIG. 2B presents a schematic top view of an undercarriage of the wheelchair transportation unit, in accordance with a preferred embodiment of the present invention.

Reference is now made to FIG. 2A, which presents details of the wheelchair transportation unit 16 for transporting the wheelchair 12, constructed and operative in accordance with a preferred embodiment of the present invention. FIG. 2A shows a typical use of the wheelchair transportation unit 16 transporting the wheelchair 12, such as ascending a flight of stairs 50. It is appreciated that the transportation of the wheelchair 12 over the flight of stairs 50 is exemplary. It is also appreciated that the wheelchair transportation unit 16 is able to transport the wheelchair 12 over other obstacles including, inter alia, descending the flight of stairs and/or an icy surface and/or a muddy surface.

The chassis 32 supports the pivotal support platform 52, which is configured to support the wheelchair 12. The wheelchair securing device 27 secures the wheelchair 12 to the wheelchair transportation unit 16. The wheelchair transportation unit 16 further includes a platform adjusting unit 56 for adjusting a pitch orientation of the pivotal support platform 52 so as to maintain alignment of the pivotal support platform 52 parallel to a horizontal plane 58, during the transportation of the user 20 over the obstacle 14.

Figure 4A:
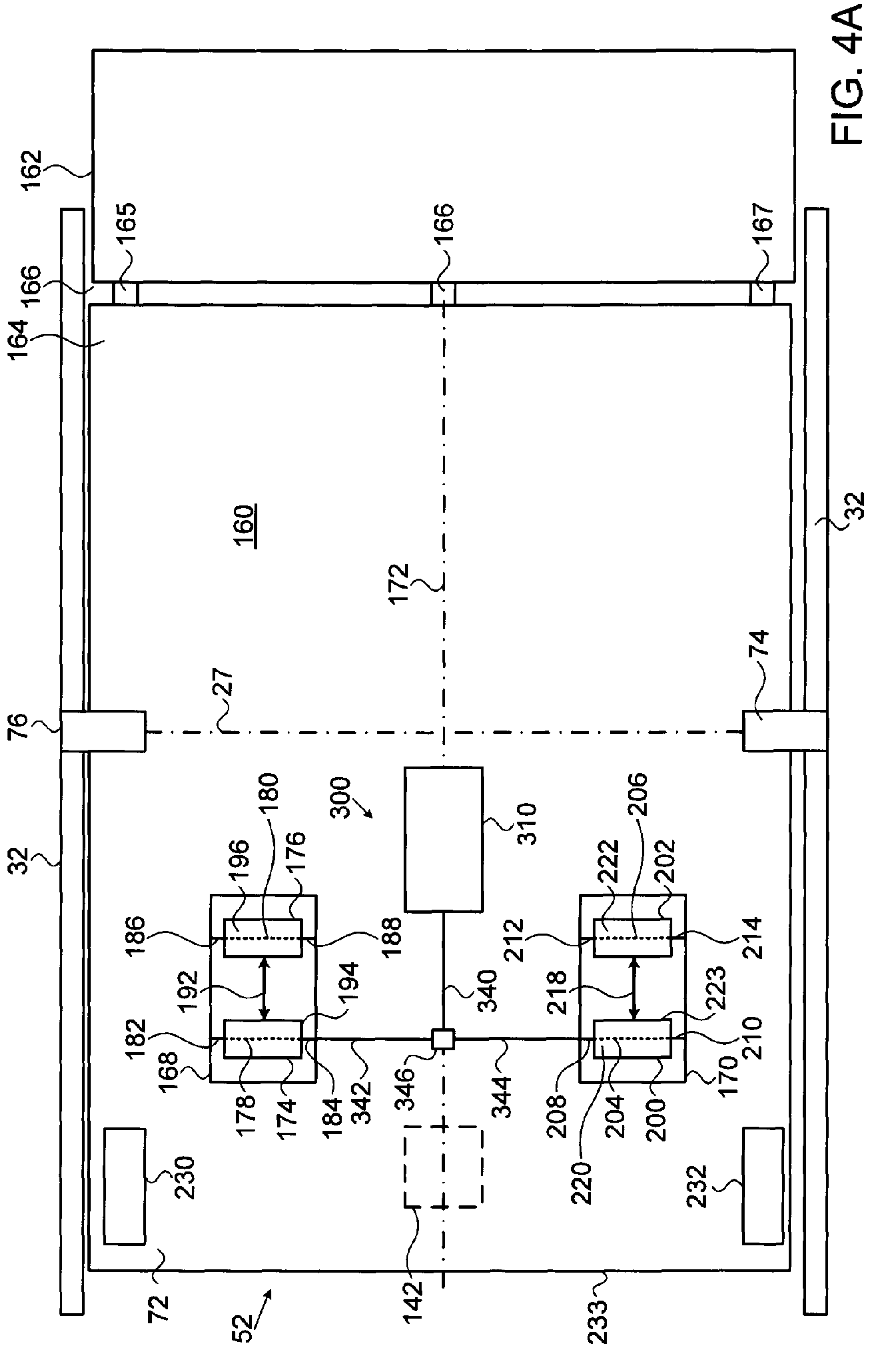
FIG. 4A presents a schematic view of a lower surface of the pivotal support platform, in accordance with a preferred embodiment of the present invention.

The pivotal support platform 52 has a proximal end 70 and a distal end 72 and is pivotally coupled to the chassis 32 by means of the pivots 74 and 76 (FIG. 4A).

A gyroscope 78 is attached to a lower surface 80 of the pivotal support platform 52 for sensing at least one change in the pitch orientation of the pivotal support platform 52 during transportation of the wheelchair 12. The sensed orientation of the pivotal support platform 52 is forwarded to the controller unit 30. The gyroscope 78 senses that the pivotal support platform 52 is not parallel to the horizontal plane 58, for example, during the wheelchair transportation unit 16 ascending and/or descending the flight of steps 50, the gyroscope 78 forwards this information to the controller unit 30. Thereupon, in accordance with this information regarding the orientation of the pivotal support platform 52, the controller unit 30 instructs the platform adjusting unit 56 to adjust the orientation of the pivotal support platform 52 so as to realign the pivotal support platform 52 to be parallel to the horizontal plane 58. The platform adjusting unit 56 maintains the horizontal alignment of the pivotal support platform 52, such that the user 20 does not feel any discomfort during the at least one transportation operation. In addition, the horizontal alignment of the pivotal support platform 52 ensures the user's safety during transporting the user 20 over raised and/or depressed obstacles. Moreover, maintaining the horizontal alignment of the pivotal support platform 52 ensures that the cylinders 176, 178, 200 and 202 are subjected to the same forces, such as gravitational forces, as would be encountered during transporting the wheelchair 12 on the horizontal plane 58. Thus, no bias is expected during measuring the rotational speeds of the cylinders 176 and 200 and the measured rotational speeds of the cylinders 170 and 200 represent corresponding rotational speeds of the cylinders 178 and 200 as would be measured during an equivalent transportation operation over the horizontal plane 58.

Reference is now made to FIG. 2B, which presents a schematic top view of the undercarriage 40 of the wheelchair transportation unit 16, constructed and operative in accordance with a preferred embodiment of the present invention. FIG. 2B shows that the undercarriage 40 includes, inter alia, vertical support struts 41A, 41B, 41C and 41D for supporting the chassis 32, a horizontal central strut 41E, which supports, inter alia, the drive mechanism 38, a speed measuring system 606 and the traction units 45A and 45B.

The drive mechanism 38 includes, inter alia, at least two traction motors 82 and 83, such as electric motors, mechanically coupled to at least two gear boxes 84 and 85, respectively. The gear boxes 84 and 85 are mechanically coupled to drive shafts 86 and 87, respectively, and transmit traction power to the traction units 45A and 45B.

The traction unit 45A includes, inter alia, the wheel group 90 and the traction unit 45B includes, inter alia, the wheel group 91. The wheel group 90 includes wheels 92, 94 and 96, which are coupled to the undercarriage 40 by means of axles 104, 106 and 108, respectively. The wheel group 91 includes wheels 98, 100 and 102, which are coupled to the undercarriage 40 by means of axles 110, 112 and 114, respectively.

The wheel group 90 includes suspension units 105, 107 and 109 and the wheel group 91 includes suspension units 111, 113 and 115.

The gear box 84 is mechanically coupled to the wheel group 90 by a linkage 86, such as a linkage chain and the gear box 85 is mechanically coupled to the wheel group 91 by a linkage 87, such as a linkage chain.

The controller unit 30 is electrically coupled to the traction motors 82 and 83 by communication links 43A and 43B, respectively. The controller unit 30 forwards the at least one computed torque to the traction units 45A and 45B.

The motors 82 and 83 drive the wheelchair transportation unit 16 in accordance with the at least one computed rotational speed, via the gear boxes 84 and 85, respectively and the drive shafts 86 and 87, respectively.

The speed measuring system 606 measures at least one transportation speed of the wheelchair transportation unit 16 and forwards the at least one transportation speed to the controller unit 30, as described below.

Figure 2C:
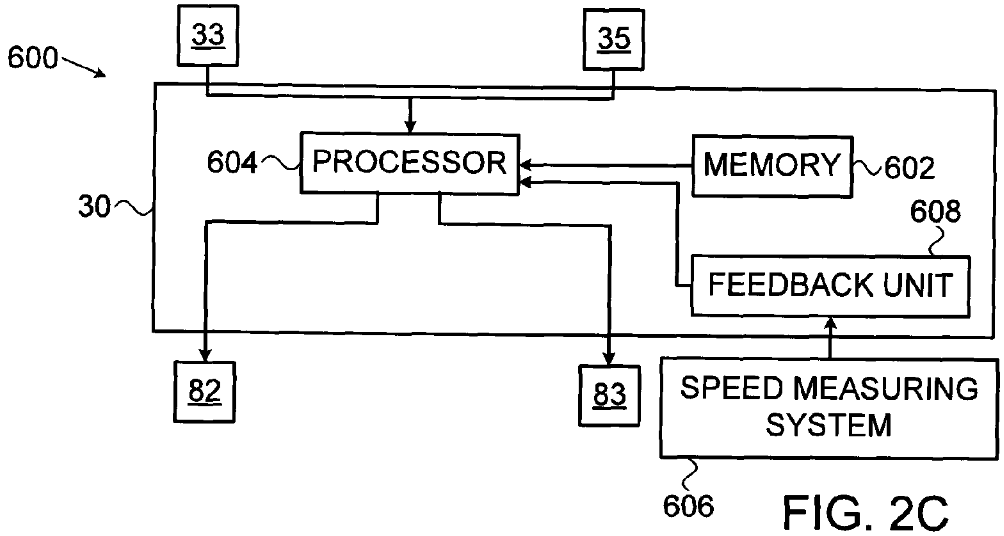
FIG. 2C is a schematic diagram of the controller unit and the various ancillary units for controlling at least one transportation operation, in accordance with a preferred embodiment of the present invention.

Reference is now made to FIG. 2C, which is a schematic diagram 600 of the controller unit 30 and the various ancillary units for controlling the at least one transportation operation, in accordance with a preferred embodiment of the present invention. FIG. 2C shows the controller unit 30 includes, inter alia, a memory 602 in communication with a processor 604. The speed sensors 33 and 35 forward the at least one measured rotational speeds to the processor 604. The memory 602 provides various wheelchair data, such as the wheelbase width of the wheelchair 12 and the diameters of the rotating cylinders 176, 178, 200 and 202, to the processor 604, thereby enabling the processor 604 to compute a required at least one corresponding rotational speed for each of the wheel groups 90 and 91 of the wheelchair transportation unit 16.

In accordance with the at least one computed rotational speed and the relevant wheelchair data as well as wheelchair transporting unit 16 data, such as the weight of the wheelchair transportation unit and its wheels' diameters, stored in the memory 602, the processor 604 computes the at least one required torque to be provided to the traction units 45A and 45B for driving the wheelchair transportation unit 16 while overcoming the at least one obstacle 14.

The speed measuring system 606 including, inter alia, at least one speed sensor coupled to at least each member of the wheel units 90 and 91 measures a current at least one transportation speed of the wheelchair transportation unit 16, as is known in the art. The measured current at least one transportation speed is forwarded to a feedback unit 608. The feedback unit 608 forwards the current at least one transportation speed to the processor 604. Thereupon, the processor 604 adjusts the at least one required torque so that the wheelchair transportation unit 16 proceeds at at least one transportation speed equivalent to a speed of the wheelchair 12 as though traveling on the horizontal plane 58.

Thus, although the user 20 is being transported over the at least one obstacle 14, the user 20 experiences that the wheelchair transportation unit 16 proceeds at a speed equivalent to the speed of the wheelchair 12 traveling on the horizontal plane 58, without the wheelchair transportation unit 12.

It is appreciated that under certain operational conditions, such as a flight of stairs typically, the speed of the wheelchair transportation unit 16 is typically limited due to safety and operational constraints.

Figure 2D:
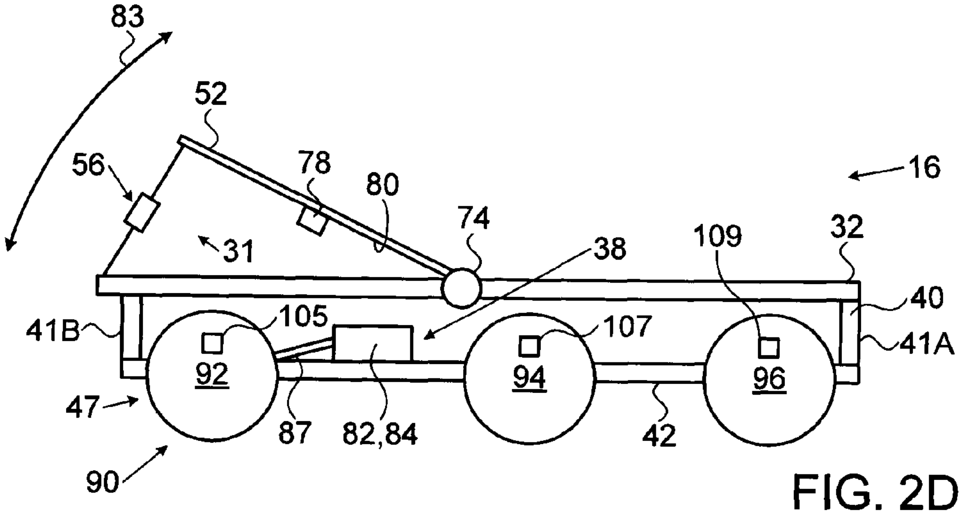
FIG. 2D presents a side view of the wheelchair transportation unit with a pivotal support platform for supporting the wheelchair in a raised orientation and with the wheelchair transportation unit including a group of wheels, in accordance with a preferred embodiment of the present invention.

Reference is now made to FIG. 2D, which presents a side view of the wheelchair transportation unit 16 with the pivotal support platform 52 in a raised orientation and with the wheel group 90, in accordance with a preferred embodiment of the present invention. FIG. 2D shows that the undercarriage 40 supports the drive mechanism 38, which provides a required traction power for transporting the wheelchair transportation unit 16 over the at least one obstacle 14. The platform adjusting unit 56 raises and lowers the pivotal support platform 52 about the pivots 74 and 76 in the vertical plane as shown by a direction arrow 83.

Figure 2E:
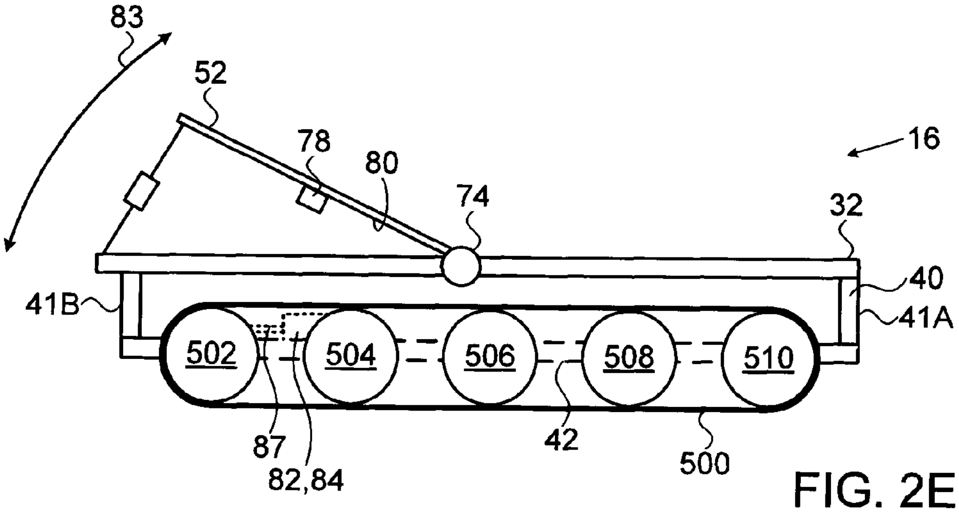
FIG. 2E presents a side view of the wheelchair transportation unit with the pivotal support platform in a raised orientation and with the wheelchair transportation unit including at least one pair of caterpillar tracks, in accordance with a preferred embodiment of the present invention.

Reference is now made to FIG. 2E, which presents a side view of the wheelchair transportation unit 16 including at least one caterpillar track unit 500 with the pivotal support platform 52 in a raised orientation, in accordance with another preferred embodiment of the present invention. The groups of wheels 90 and 91 are replaced with the at least one caterpillar unit. For the sake of clarity, only a single caterpillar track 500 with drive wheels 502, 504, 506, 508 and 510 are shown in FIG. 2E.

The caterpillar track system 500 enables the wheelchair 12 to be transported by the wheelchair transportation unit 16 over obstacles, such as muddy and/or sandy terrain and/or an icy surface. It is appreciated that the drive mechanism 38 is adapted accordingly for providing the traction power to the caterpillar track system, as is known in the art, such as embedding relevant data into the controller unit 30 such that the control actions are adapted to this configuration.

Figure 3:
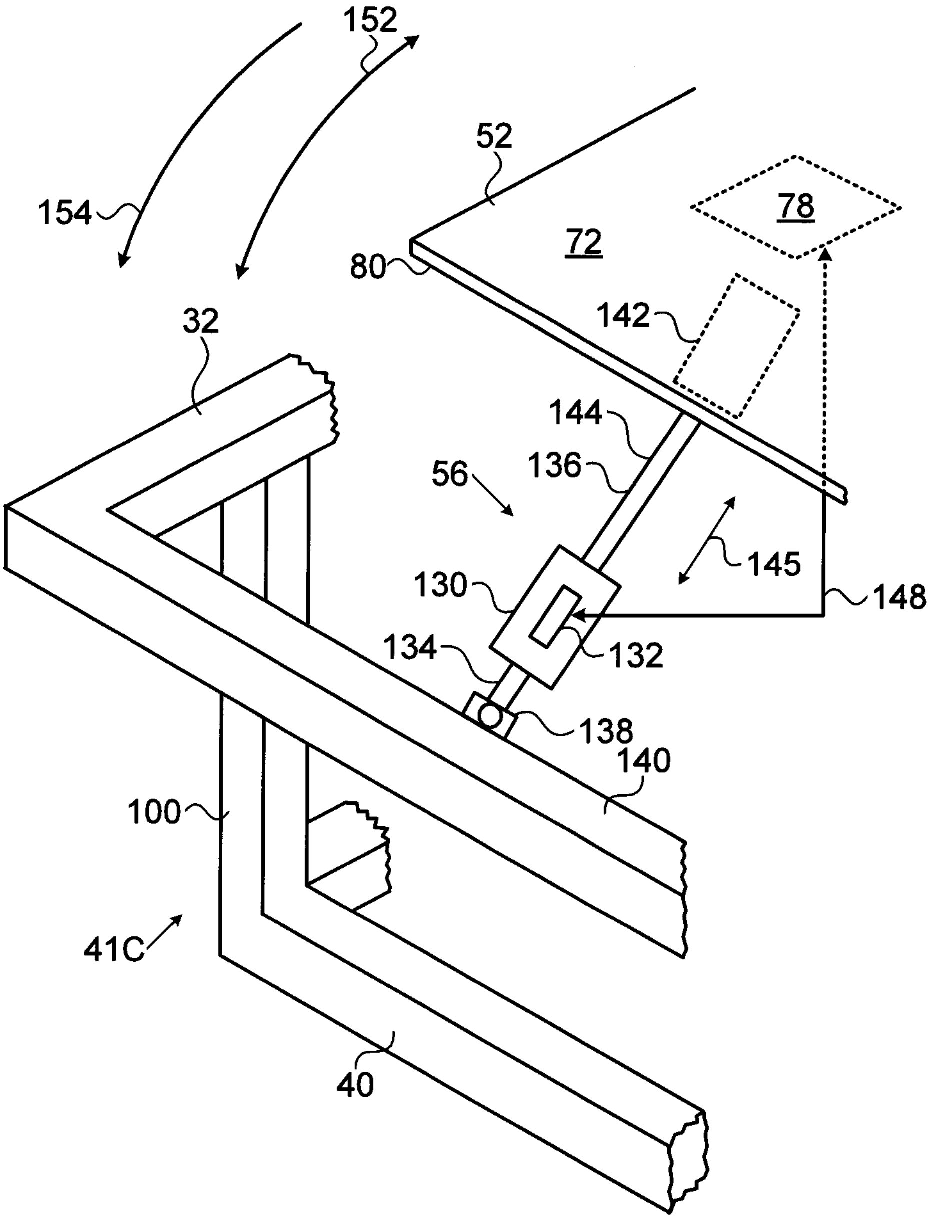
FIG. 3 presents which presents details of a platform adjusting unit, constructed and operative in accordance with a preferred embodiment of the present invention.

Reference is now made to FIG. 3, which presents details of the platform adjusting unit 56, operative and constructed in accordance with a preferred embodiment of the present invention. The platform adjusting unit 56 is typically located at the distal end 72 of the pivotal support platform 52. For the sake of clarity only the strut 41C is shown in FIG. 3. FIG. 3 shows the strut 41C supporting the chassis 32 and mechanically coupling the undercarriage 40 and the chassis 32.

The platform adjusting unit 56 includes, inter alia, an actuator 130, such as a linear actuator, to which is coupled a motor device 132, such an electric motor, for operating the actuator 130. The actuator 130 includes, inter alia, a fixed arm 134 and an extendible arm 136. The actuator 130 is pivotally coupled to a beam 140 of the chassis 32, by means of the arm 134 and a pivot 138. The extendible arm 136 is pivotally coupled to the lower surface 80 of the pivotal support platform 52 by means of a pivot 142.

The extendible arm 136 includes an adjustable span 144 enabling adjusting the configuration of the actuator 130, as indicated by an arrow 145.

The gyroscope 78 operably senses the horizontal orientation of the pivotal support platform 52 and forwards this information to the controller unit 30. A change in the pitch orientation of the pivotal support platform 52 indicates that the pivotal support platform 52 is no longer in parallel alignment with the horizontal plane 58 and the signal forwarded to the controller unit 30 is modified accordingly. The extent of change in the pitch orientation and the pace of the change in the pitch orientation are utilized by the controller unit 30 to forward an appropriate alignment signal to the motor device 132. Thereupon, the controller unit 30 communicates at least one adjust-platform-orientation instruction to the motor 132, via a communications channel 148. Upon receiving this instruction, the motor 132 is activated to adjust the configuration of the actuator 130 by adjusting the span 144 in order to maintain the pivotal support platform 52 parallel to the horizontal plane 58. The motor 132 is operated until the pivotal support platform 52 is in parallel alignment with the horizontal plane 58, as sensed by the gyroscope 78. Upon detecting the horizontal realignment of the pivotal support platform 52, the gyroscope 78 forwards a corresponding signal to the controller unit 30. The controller unit 30 communicates at least one terminate-adjustment instruction to the motor 132 and the motor 132 ceases operation.

It is appreciated that the actuator 130 is activated to increase the span 144 and/or decrease span 144 until the pivotal support platform 52 is in parallel alignment with the horizontal plane 58, as described above.

An alteration in the configuration of the actuator 130, as indicated by the direction arrow 145, adjusts the orientation of the pivotal support platform 52 about the pivots 74 and 76 (FIG. 4A), as indicated by the direction arrows 152 and 154, as is known in the art.

Reference is now made to FIG. 4A, which presents a schematic top view of the pivotal support platform 52, constructed and operative in accordance with a preferred embodiment of the present invention. FIG. 4A shows that the pivotal support platform 52 includes, inter alia, a support portion 160 for supporting the wheelchair 12 and the roll-on/roll-off ramp 162 for providing roll-on and roll-off access to the support portion 160. The roll-on/roll-off ramp 162 is pivotally coupled to a proximal end 164 of the pivotal support platform 52 by means of pivots 165, 166 and 167 located between the support portion 160 and the roll-on/roll-off ramp 162.

The orientation of the roll-on/roll-off ramp 162 for accessing and disembarking from the pivotal support platform 52 is typically controlled and monitored by the helper. Following the user 20 parking the wheelchair 12 on the pivotal support platform 52, the helper ensures that the wheelchair 12 is correctly positioned and secured to the pivotal support platform 52.

Additionally, following the wheelchair 12 accessing the pivotal support platform 52, the helper folds the ramp 162, either manually or by activating a ramp storage control, into the transportation configuration, as shown in FIG. 1.

Two cutouts 168 and 170 are located in proximity to a distal end 72 of the pivotal support platform 52. The cutouts 168 and 170 are typically equidistant from a longitudinal axis 172 of the support portion 160.

The cutout 168 includes, inter alia, at least two rotating members, such as rotating cylinders 174 and 176, which freely rotate about their longitudinal axes 178 and 180, respectively, by means of axles 182 and 184, and 186 and 188, respectively. The rotating cylinders 174 and 176 support the main wheel of the wheelchair 31 during the at least one transportation operation, as described below.

An adjustable gap 192 is located between the cylinders 174 and 176. The gap 192 is adjusted by a gap adjusting mechanism 300 in order to properly support the main wheel 31 of the wheelchair 12.

The surfaces 194 and 196 are typically coated with a material, such as Hypalon-80, thereby generating frictional contact between the main wheel of the wheelchair 31 and the cylinders 174 and 176. Thus, the rotation of the main wheel of the wheelchair 31 rotates the rotating cylinders 174 and 176 at substantially the same tangential speed as the main wheel 31. The speed sensor 33 (FIG. 4B) senses at least one rotational speed of the cylinder 174, as described below and communicates the speed of rotation to the controller unit 30.

The cutout 170 includes, inter alia, at least two rotating members, such as cylinders 200 and 202, which freely rotate about their longitudinal axes 204 and 206, respectively, by means of axles 208 and 210, and 212 and 214, respectively. The cylinders 200 and 202 support the main wheel of the wheelchair 29 during the at least one transportation operation, as described below.

An adjustable gap 218 is located between the cylinders 200 and 202. The gap 218 is adjusted by the gap adjusting mechanism 300 to support the main wheel of the wheelchair 29 of the wheelchair 12.

The gaps 192 and 218 are adjusted by the gap adjusting mechanism 300, as described below, so that the wheelchair transportation unit 16 is able to support various types of wheelchairs, having different main wheel diameters.

The surfaces 220 and 222 are typically coated with a material, such as Hypalon-80, thereby generating frictional contact between the main wheel of the wheelchair 29 and the cylinders 220 and 222. Thus, the rotation of the main wheel of the wheelchair 29 rotates the rotating cylinders 220 and 222 at substantially the same tangential speed as the main wheel 31. The speed sensor 35 (FIG. 4B) senses at least one rotational speed of the cylinder 220 and is configured to communicate the at least one rotational speed to the controller unit 30.

FIG. 4A also shows the locations of the wheelchair securing units 230 and 232 relative to the cutouts 168 and 170.

The gap adjusting mechanism 300 includes, inter alia, an actuator and associated motor 310 and a shaft 340 as well as transverse shafts 342 and 344, as described below.

Figure 4B:
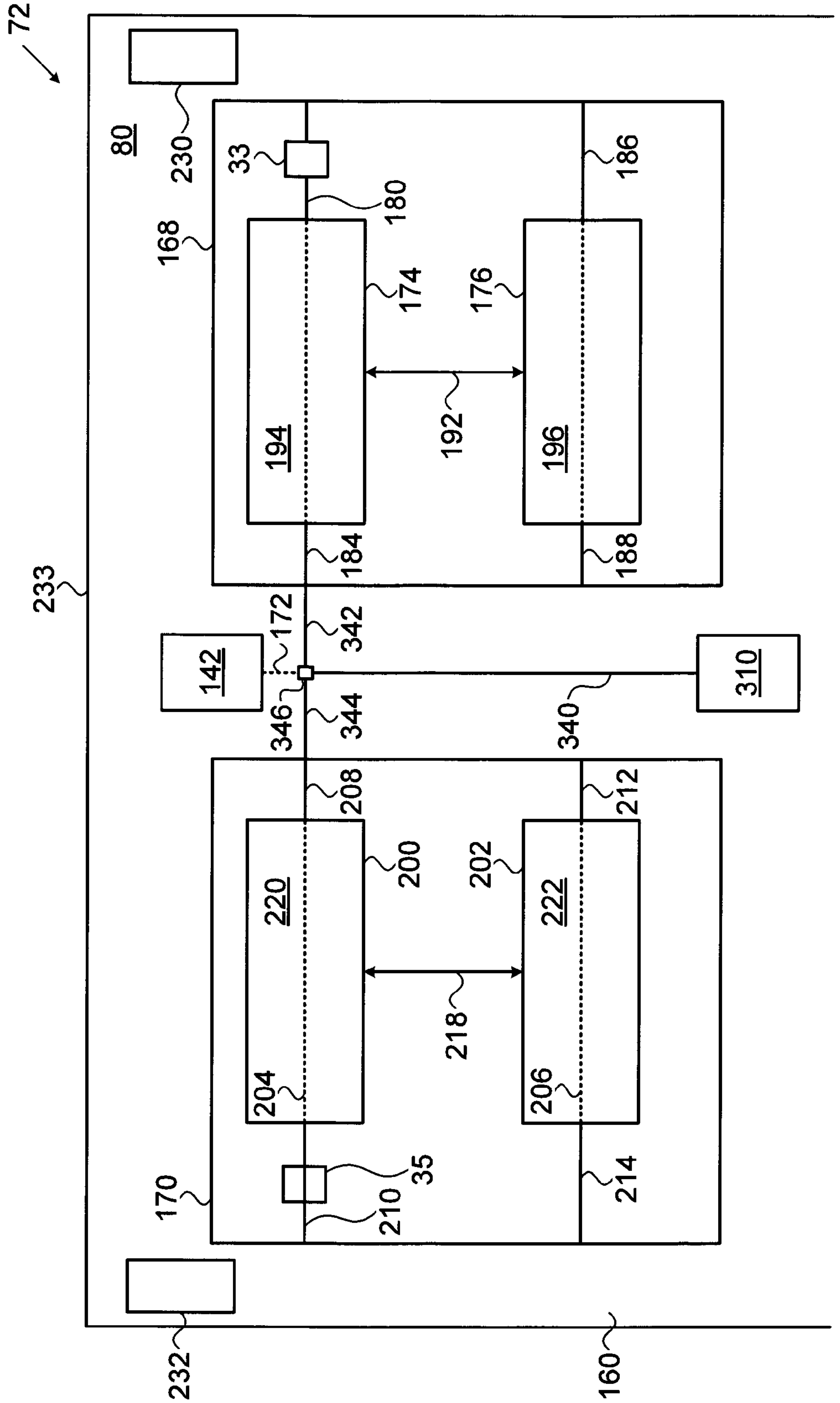
FIG. 4B presents a schematic view of the lower surface of the pivotal support platform at a distal end of the pivotal support platform, in accordance with a preferred embodiment of the present invention.

Reference is now made to FIG. 4B, which presents a schematic view of the lower surface 80 of the pivotal support platform 52 at the distal end 72, in accordance with a preferred embodiment of the present invention. The speed sensors 33 and 35 are mechanically coupled to the axles 180 and 210, respectively, in order to measure the at least one rotational speed of the rotating cylinders 174 and 200, respectively. As described above, the cylinders (194 and 196), and (220 and 222) are rotated by frictional contact with the main wheels 31 and 29, respectively. Thus, the rotating cylinders 174 and 200 rotate substantially at the same tangential speed as the wheels 29 and 31, respectively and the rotational speed measured by the sensors 33 and 35 is substantially the rotational speed of the cylinders 174 and 200, respectively.

The user 20 controls the transportation of the wheelchair 12 over the obstacle 14 by means of the control panel 22 and/or joystick 24. If the user wishes to be transported in a forward direction and/or a backward direction the user 20 moves the joystick 24 forward or backwards, respectively, and the wheelchair's wheels 29 and 31 rotate at substantially a constant rotational speed, as is known in the art. Due to the frictional interaction between the wheels 29 and 31, the cylinders 174 and 176 and 200 and 202, respectively, rotate at substantially the same tangential speed as that of the wheels 29 and 31, respectively. The at least one rotational speed of the cylinders (174 and 176) and (200 and 202), recorded by the sensors 33 and 35, are forwarded to the controller unit 30, which computes the corresponding at least one rotational speed of the wheels of the wheelchair 29 and 31. The computed speeds are used by the controller unit 30 to compute the required at least one torque, which is forwarded to the motors 82 and 83, respectively. Thus, the transportation unit 16 is configured to transport the user 20 at the speed corresponding to the rotational speeds of the wheels 29 and 31.

If the user 20 wishes to change the direction of motion, the user 20 adjusts the joystick 24 to point in the required direction. For example, if the user 20 wishes to move right, the user moves the joystick 24 to the right and subsequently, the wheel 29 slows while the wheel 31 maintains the constant speed. The change in the speeds of the wheel of the wheelchair 29 is communicated to the controller unit 30. The controller unit 30 instructs the drive mechanism 38 to decrease the speed of operation of the motor 82 and the rotation of the wheel unit 90 decreases, while the speed of rotation of the wheel unit 91 remains unaltered. Thus, the transportation unit 16 changes direction in accordance with the user's 20 instructions and the transportation unit 16 transports the user 20 to the right.

It is appreciated that the user 20 does not require any further skills and/or training in operating the wheelchair transportation unit 16. The user 20 is able to control the operation of the transportation unit 16 by means of the control panel 22, with which the user 20 is accustomed to use. The controller unit 30 interprets the user's instructions to transport instructions for the wheelchair transportation unit 16 in order to overcome the at least one obstacle 14.

Figure 5A:
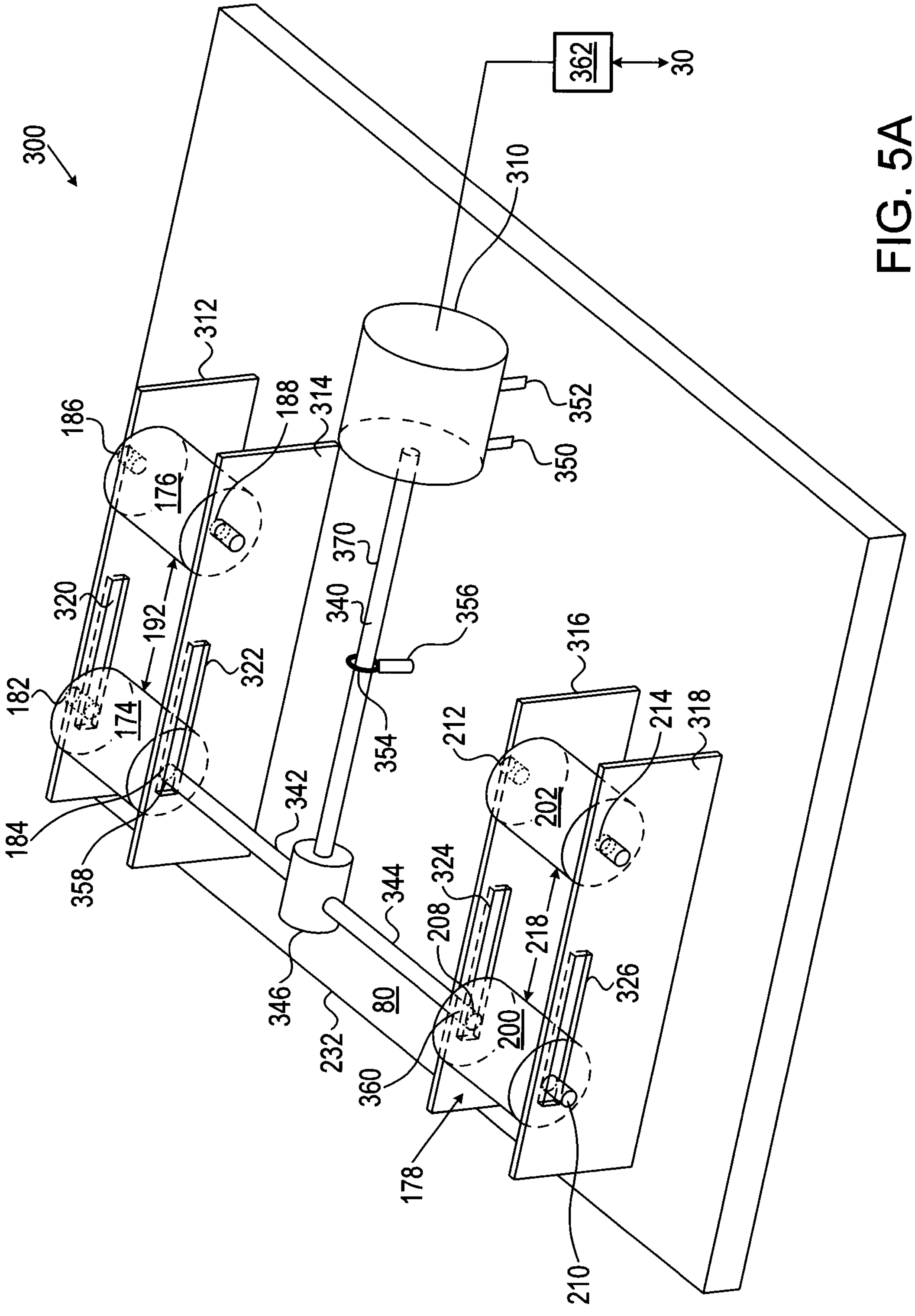
FIG. 5A which presents a schematic drawing of a gap adjusting mechanism, constructed and operative in accordance with a preferred embodiment of the present invention.

Reference is now made to FIG. 5A, which presents a schematic drawing of the gap adjusting mechanism 300, operative and constructed in accordance with a preferred embodiment of the present invention. The gap adjusting mechanism 300 permits the wheelchair transportation unit 16 to transport wheelchairs having main wheels with different diameters. The gap adjusting mechanism 300 includes, inter alia, the actuator and associated motor unit 310 for adjusting the gaps 192 and 218 between the cylinder pairs (174 and 176), and (200 and 202), respectively. FIG. 5A shows that the cylinders 174 and 176 are supported by panels 312 and 314, respectively and the cylinders 200 and 202 are supported by the panels 316 and 318, respectively. The panels 312 and 314 include grooves 320 and 322, respectively, for supporting cylinder 174 axles 182 and 184, respectively. Thus, the cylinder 174 is laterally displaceable in the grooves 320 and 322. The axles 186 and 188 of the cylinder 176 are rotatably attached to the panels 312 and 314, respectively, allowing only rotational motion of the cylinder 176.

The panels 316 and 318 include grooves 324 and 326 for supporting cylinder 200 axles 208 and 210, respectively. Thus, the cylinder 200 is laterally displaceable in the grooves 324 and 326. The axles 212 and 214 of the cylinder 202 are rotatably attached to the panels 316 and 318, respectively, allowing only rotational motion of the cylinder 202.

Figure 5B:
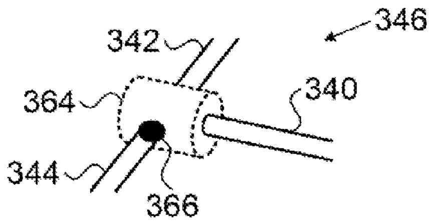
FIG. 5B which schematically shows details of a mechanical link between shafts of the gap adjusting mechanism.

The actuator and motor unit 310 is mechanically coupled to the axles 184 and 208 by means of the shaft 340 and the transverse shafts 342 and 344, as shown in FIG. 5A. A mechanical link device 346 couples the shafts 342 and 344 to the shaft 340 (FIG. 5B).

The actuator and motor unit 310 is supported and attached to the lower surface 80 of the pivotal support platform 52 by means of support posts 350 and 352 and the drive shaft 340 is attached and supported to the lower surface 80 by a ring 354 and support post 356. The ring 354 enables lateral movement of the shaft 340, as described below. Thus, by adjusting the gaps 192 and 218 between the cylinders (174 and 176), and the cylinders (220 and 202), respectively, the pivotal support platform 52 is able to support wheelchairs of various wheels dimensions.

The transverse shaft 342 is typically coupled to the axle 184 by means of a weld contact 358 and the transverse shaft 344 is typically coupled to the axle 208 by means of a weld contact 360.

A toggle-type activation unit 362, which is in communication with the controller unit 30, is activated by the helper for adjusting the length of the shaft 340 in accordance with the wheelchair data, as described above. By adjusting the length of the shaft 340, the shafts 342 and 344 displace the positions of the cylinders 174 and 200, respectively, in the grooves (320 and 322), and (324 and 326), respectively. Thus, the actuator and motor unit 310 adjusts a span 370 of the shaft 340 and the widths of the gaps 192 and 218 are altered relative to the cylinders 176 and 202, respectively.

Reference is now made to FIG. 5B, which schematically shows details of a mechanical link device 346, in accordance with a preferred embodiment of the present invention. FIG. 5B shows that the mechanical link device 346 includes, inter alia, a cover 364 which provides protection for mechanical join 366 between the shaft 340 and the shafts 342 and 344, such as a weld joint.

Figure 6A:
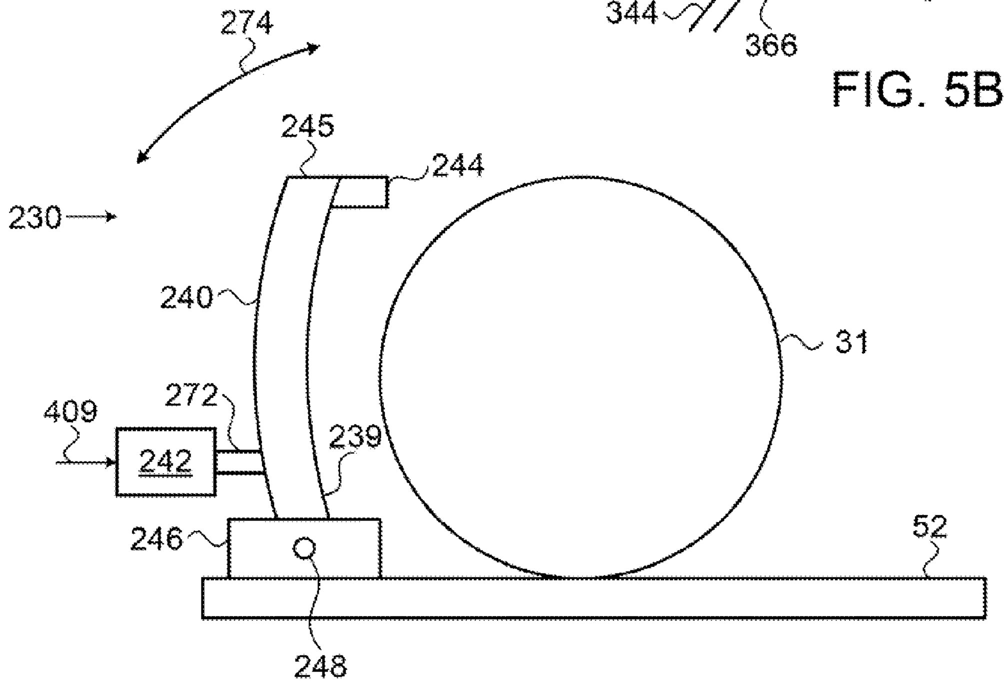
FIGS. 6A and 6B present schematic side views of the wheelchair securing units, respectively, prior to securing the wheelchair to the pivotal support platform, in accordance with a preferred embodiment of the present invention.
Figure 6B:
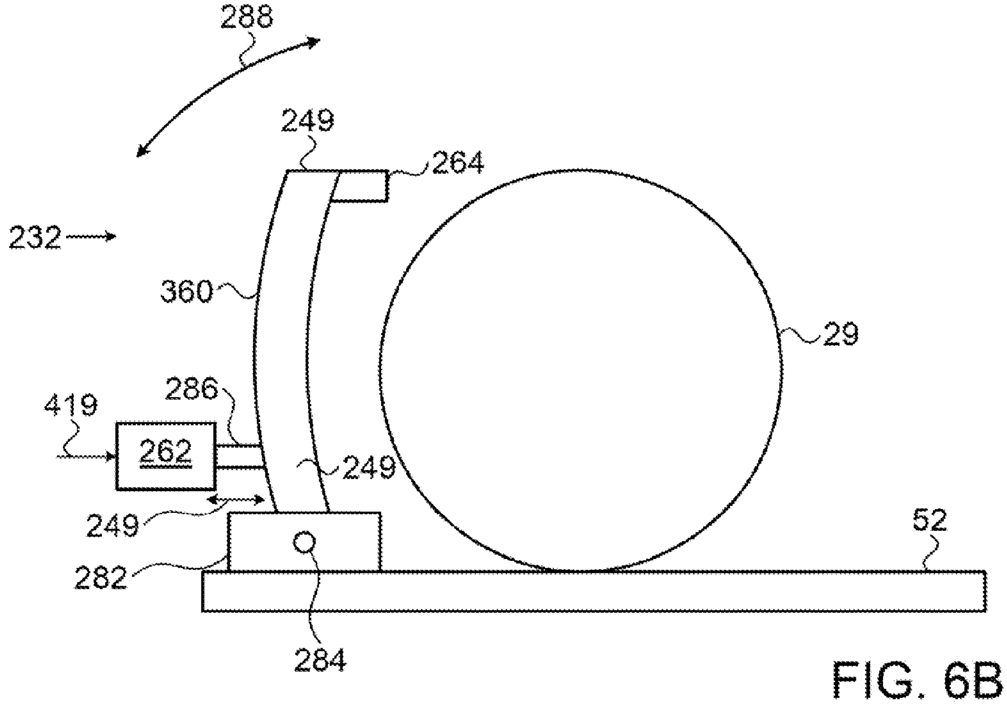

Reference is now made to FIGS. 6A and 6B, which present schematic side views of the wheelchair transportation unit 16 prior to securing the wheelchair to the pivotal support platform 52 by means of at least two wheelchair securing units 230 and 232, respectively, in accordance with a preferred embodiment of the present invention. The two wheelchair securing units 230 and 232 are pivotally coupled to the pivotal support platform 52, as described below and are operative to secure the wheelchair 12 to the pivotal support platform 52.

Figure 6C:
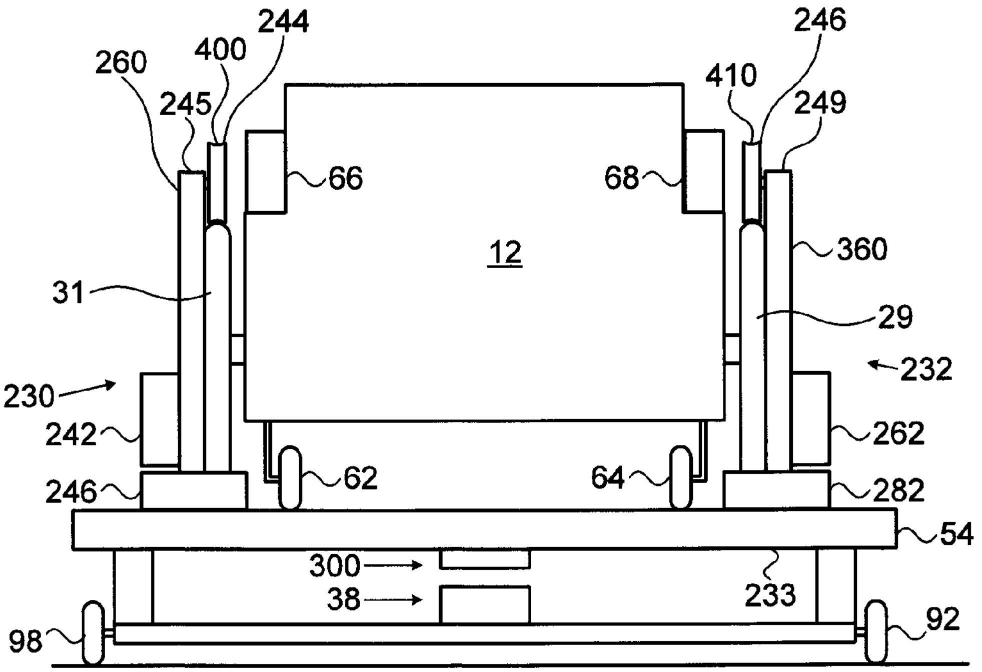
FIG. 6C which schematically presents a rear view of the wheelchair secured to the pivotal support platform by means of the wheelchair securing units, in accordance with a preferred embodiment of the present invention, and FIGS. 7A and 7B which schematically show details of wheel harnessing units, constructed and operative in accordance with a preferred embodiment of the present invention.

FIG. 6A presents details of the securing unit 230, which includes, inter alia, an arch-shaped strut 240 and an actuator 242 for displacing the arch-shaped strut 240 from a wheelchair-load-position (FIG. 6A) to a wheelchair-secure-position (FIG. 6C). At a proximal end 239 of the arch-shaped strut 240, the arch-shaped strut 240 is pivotally coupled to the pivotal support platform 52, by means of a pivot 248 and a bracket 246. A wheel harnessing unit 244 is located at a distal end 245 of the strut 240 and engages the wheel 31 in the wheelchair-lock-position (FIG. 6C), as described below.

FIG. 6B presents details of the securing unit 232, which includes, inter alia, an arch-shaped strut 360 and an actuator 262 for displacing the arch-shaped strut 360 from a wheelchair-load-position (FIG. 6A) to a wheelchair-secure-position (FIG. 6C). At a proximal end 249 of the arch-shaped strut 360, the arch-shaped strut 360 is pivotally coupled to the pivotal support platform 52, by means of a pivot 284 and a bracket 282. A wheel harnessing unit 264 is located at a distal end 245 of the arch-shaped strut 240 and engages the wheel 29 in the wheelchair-lock-position (FIG. 6C), as described below.

Reference is now made to FIG. 6C, which schematically presents a rear view of the wheelchair 12 secured to the pivotal support platform 52 by means of the securing units 230 and 232, in accordance with a preferred embodiment of the present invention. The units 230 and 232 are located in proximity to the cutouts 168 and 170 as shown in FIGS. 4A and 4B. The units 230 and 232 are pivotably coupled to brackets 246 and 282, respectively, as described above. In the wheelchair-lock-position, the wheel harnessing units 244 and 264 secure the wheelchair 12 to the pivotal support platform 52, as described below.

The wheel harnessing unit 244 includes, inter alia, a freely-rotating roller 400 which engages the wheelchair wheel 31 in the wheelchair-lock position. The freely-rotating roller 400 permits uninhibited rotation of the wheel 31 while the wheelchair is secured to the pivotal support platform 52, as described below.

The wheel harnessing unit 264 includes, inter alia, a freely-rotating roller 410 which engages the wheelchair wheel 29 in the wheelchair-lock position. The freely-rotating roller 410 permits uninhibited rotation of the wheel 29 while the wheelchair is secured to the pivotal support platform 52, as described below.

Referring back to FIG. 6A, the actuator 242 is coupled to the arch-shaped strut 240 by means of a moving arm 272. The movement of the arm 272 displaces the arch-shaped strut 240 in the vertical plane, as indicated by an arrow 274. As shown in FIG. 6C, in a securing position, the wheelchair 12 is secured to the pivotal support platform 52 by means of the freely-rotating roller 400 engaging the wheel 31.

Referring back to FIG. 6B, the actuator 262 is coupled to the arch-shaped strut 360 by means of a moving arm 286. The movement of the arm 286 displaces the arch-shaped strut 360 in the vertical plane, as indicated by an arrow 288. As shown in FIG. 6C, in a securing position, the wheelchair 12 is secured to the pivotal support platform 52 by means of the freely-rotating roller 410 engaging the wheel 29.

Figures 7A, 7B:
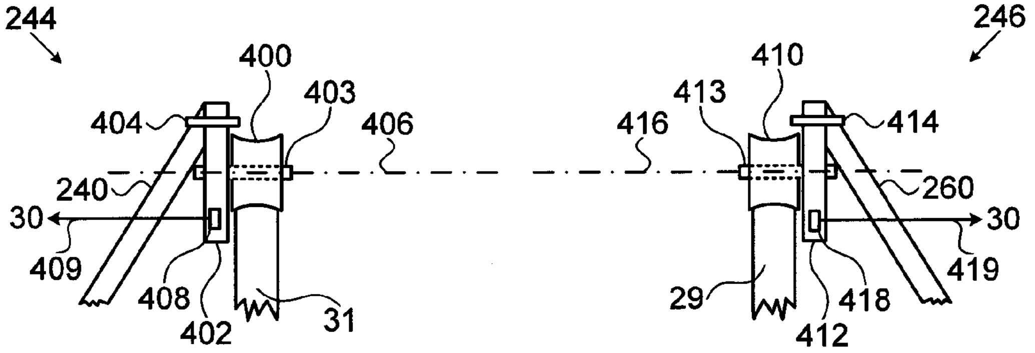

Reference is now made to FIG. 7A, which schematically shows details of the wheel harnessing unit 244, constructed and operative in accordance with a preferred embodiment of the present invention. The harnessing unit 244 includes, inter alia, the freely-rotating roller 400 attached to a shaft 402 by means of a pin 403. The freely-rotating roller 400 engages the wheel 31. The shaft 402 is coupled to the arch-shaped strut 240 by means of a pin 404, which enables the movement of the shaft 402 and the pin 403 about an axis 406.

A pressure switch 408 is typically located in the shaft 402, such that as the freely-rotating roller 400 engages the wheel of the wheelchair 31, the pressure switch 408 senses an increase in mechanical pressure on the freely-rotating roller 400. If this pressure exceeds a predefined pressure, the pressure switch 408 forwards a roller-engagement signal 409, typically wirelessly, to the controller unit 30. Whereupon, the controller unit 30 sends an instruction 409 to the actuator 242 to cease further movement and the freely-rotating roller 400 engages the wheel of the wheelchair 31 without inhibiting the rotation of the wheel of the wheelchair 31, during the at least one transportation operation of the wheelchair 12.

Reference is now made to FIG. 7B, which schematically shows details of the wheel harnessing unit 246, constructed and operative in accordance with a preferred embodiment of the present invention. The harnessing unit 246 includes, inter alia, the freely-rotating roller 410 attached to a shaft 412 by means of a pin 413. The freely-rotating roller 410 engages the wheel of the wheelchair 29. The shaft 412 is coupled to the strut 360 by means of a pin 414, which enables the movement of the shaft 412 and the pin 413 about an axis 416.

A pressure switch 418 is typically located in the shaft 412, such that as the freely-rotating roller 410 engages the wheel of the wheelchair 29, the pressure switch 418 senses an increase in mechanical pressure on the roller 410. If this pressure exceeds a predefined pressure, the pressure sensor 418 forwards a roller-engagement signal 419, typically wirelessly, to the controller unit 30. Whereupon, the controller unit 30 sends an instruction 419 to the actuator 262 to cease further movement and the freely-rotating roller 410 engages the wheel of the wheelchair 29 without inhibiting the rotation of the wheel of the wheelchair 29, during the at least one transportation operation of the wheelchair 12.

While the disclosure has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings without departing from the essential scope thereof. Therefore, it is intended that the disclosed subject matter not be limited to the particular embodiment disclosed as the best mode contemplated for carrying out this invention, but only by the claims that follow.

The invention claimed is:

1. A wheelchair transportation system for transporting a wheelchair over at least one obstacle, comprising:

a wheelchair transportation unit being operable to transport said wheelchair over said at least one obstacle during at least one transportation operation of said wheelchair, said wheelchair transportation unit comprising:

a pivotal support platform configured to support said wheelchair and pivotally coupled to a chassis of said wheelchair transportation unit, said pivotal support platform comprises at least one group of rotating members frictionally engaging at least one main wheel of said wheelchair, wherein during said at least one transportation operation, said at least one main wheel being operable to rotate said at least one group of rotating members thereby a wheelchair user operably controls and guides said wheelchair transportation unit by adjusting at least one rotational speed of said at least one main wheel.

2. The wheelchair transportation system according to claim 1, further comprising at least one speed sensor mechanically coupled to at least one member of said at least one group of rotating members and configured to measure at least one rotational speed of said at least one member, wherein said at least one speed sensor being operable to communicate to a controller unit said at least one measured rotational speed of said at least one member.

3. The wheelchair transportation system according to claim 2, wherein during said at least one transportation operation, said controller unit being operable to compute at least one torque corresponding to said at least one measured rotational speed of said at least one group of rotating members and forwarding said at least one computed torque to a drive mechanism of said wheelchair transportation unit thereby activating said drive mechanism to drive said wheelchair transportation unit over said at least one obstacle in accordance with said at least one computed torque.

4. The wheelchair transportation system according to claim 3, wherein said wheelchair transportation unit further comprises an undercarriage configured to support said chassis, said undercarriage comprises:

at least one traction unit mechanically coupled to said drive mechanism and being operable to transport said wheelchair transportation unit during said at least one transportation operation.

5. The wheelchair transportation system according to claim 4, wherein said drive mechanism comprises:

at least one traction motor for generating a required traction power corresponding to said at least one computed torque;

at least one gear box mechanically coupled to said at least one traction motor, and at least one drive shaft mechanically coupling said at least one gear box to at least one traction unit and being operable to transfer said required traction power to at least one traction unit.

6. The wheelchair transportation system according to claim 5, wherein said at least one traction unit comprises at least one pair of traction wheels.

7. The wheelchair transportation system according to claim 5, wherein said at least one traction unit comprises at least one pair of caterpillar tracks.

8. The wheelchair transportation system according to claim 1, wherein said wheelchair transportation unit further comprises:

a gyroscope attached to said pivotal support platform and being operable to sense at least one change in a pitch orientation of said pivotal support platform during said at least one transportation operation, and a platform adjusting unit being operable to adjust said pitch orientation of said pivotal support platform, wherein subsequent to said gyroscope sensing said change in said pitch orientation, said gyroscope is configured to communicate at least one signal to said controller unit, thereupon said controller unit being further operable to forward at least one adjust-platform orientation instruction to said platform adjusting unit to adjust said pitch orientation of said pivotal support platform thereby operably maintaining a horizontal alignment of said pivotal support platform.

9. The wheelchair transportation system according to claim 8, wherein said platform adjusting unit comprises:

a first actuator having a first end coupled to said chassis and having a second end including at least one extendible arm pivotally coupled to said pivotal support platform, and a first motor coupled to said first actuator and being operable to adjust a configuration of said at least one extendible arm, wherein said first motor adjusts said configuration of said at least one extendible arm in accordance with said at least one adjust-platform-orientation instruction.

10. The wheelchair transportation system according to claim 9, wherein said adjusting of said configuration comprises increasing a span of said at least one extendible arm.

11. The wheelchair transportation system according to claim 9, wherein said adjusting of said configuration comprises decreasing a span of said at least one extendible arm.

12. The wheelchair transportation system according to claim 1, wherein said wheelchair transporting unit further comprises:

a securing unit attached to said pivotal support platform and configured to secure said wheelchair on said pivotal support platform, said securing unit comprises:

at least one arch-shaped strut having a first end pivotally coupled to said pivotal support platform by means of a bracket and a second end pivotally coupled to at least one wheel harnessing unit, and a second actuator mechanically coupled to said at least one arch-shaped strut and configured to displace said at least one wheel harnessing unit in a vertical plane above said pivotal support platform, wherein prior to said at least one transportation operation, said securing unit is activated whereby said at least one wheel harnessing unit engages at least one main wheel of said wheelchair without inhibiting rotation of said at least one main wheel.

13. The wheelchair transportation system according to claim 12, wherein said at least one wheel harnessing unit comprises:

at least one roller mechanically coupled to said at least one arched-shaped strut by means of at least one pin and at least one shaft, said at least one shaft comprises a mechanical pressure sensor, wherein upon said at least one roller engaging said at least one main wheel, said mechanical pressure sensor senses an increase in mechanical pressure on said at least one shaft and said mechanical pressure sensor forwards a roller-engagement signal to said controller unit further configured to instruct said at least one arch-shaped strut to cease further movement.

14. The wheelchair transportation system according to claim 1, wheelchair transportation unit further comprises a roll-on/roll-off ramp pivotally coupled to said pivotal support platform, wherein said wheelchair user maneuvers said wheelchair onto said pivotal support platform by means of said roll-on/roll-off ramp.

15. The wheelchair transportation system according to claim 1, wherein said at least one group of rotating members comprises at least a first rotating member and at least a second rotating member, said at least first rotating member and said at least second rotating member being operably separated by an adjustable gap.

16. The wheelchair transportation system according to claim 15, wheelchair transportation unit further comprises a gap adjusting mechanism being operable to adjust said adjustable gap, comprising:

at least one pair of panels configured to support said at least first rotating member and said at least second rotating member, each member of said at least one pair of panels having a groove configured to support said at least first member between said at least one pair of panels and said at least second rotating member being rotatably attached between said at least one pair of panels, and an actuator and motor unit mechanically coupled to said at least first rotating member by means of at least one shaft and being operable to laterally displace said at least first rotating member along said groove, wherein said actuator and motor unit is activated to adjust said adjustable gap between said at least first rotating member and said at least second rotating member by laterally displacing said at least first rotating member relative to at least said second rotating member.

* * * * *